United States Patent
Kimura et al.

(10) Patent No.: US 8,422,498 B2
(45) Date of Patent: Apr. 16, 2013

(54) INFORMATION COMMUNICATION APPARATUS, INFORMATION TRANSMITTING APPARATUS, AND INFORMATION COMMUNICATION METHOD

(75) Inventors: Hiroaki Kimura, Shinjuku (JP); Shingo Izawa, Shinjuku (JP); Takaaki Ishida, Fujisawa (JP); Kotaro Kataoka, Fujisawa (JP)

(73) Assignees: KDDI Corporation, Tokyo (JP); Keio University, Tokyo (JP)

( * ) Notice: Subject to any disclaimer, the term of this patent is extended or adjusted under 35 U.S.C. 154(b) by 167 days.

(21) Appl. No.: 12/295,058

(22) PCT Filed: Mar. 30, 2007

(86) PCT No.: PCT/JP2007/057088
§ 371 (c)(1),
(2), (4) Date: Sep. 29, 2008

(87) PCT Pub. No.: WO2007/114333
PCT Pub. Date: Oct. 11, 2007

(65) Prior Publication Data
US 2009/0245161 A1 Oct. 1, 2009

(30) Foreign Application Priority Data
Mar. 31, 2006 (JP) .................................. 2006-096982

(51) Int. Cl.
*H04L 12/28* (2006.01)
(52) U.S. Cl.
USPC .......................................................... 370/390
(58) Field of Classification Search .................... 370/390
See application file for complete search history.

(56) References Cited

U.S. PATENT DOCUMENTS
6,052,388 A  4/2000 Tajima et al.
7,113,106 B2 * 9/2006 Sendrowicz ............. 340/870.02
(Continued)

FOREIGN PATENT DOCUMENTS
JP   05-344084 A   12/1993
JP   07-235911 A   9/1995
(Continued)

OTHER PUBLICATIONS
International Search Report of PCT/JP2007/057088, date of mailing May 29, 2007.
(Continued)

Primary Examiner — Phirin Sam
Assistant Examiner — Hai-Chang Hsiung
(74) Attorney, Agent, or Firm — Westerman, Hattori, Daniels & Adrian, LLP

(57) ABSTRACT

An information communication apparatus (100A) that receives transmission information transmitted from a broadcast station, generates and relays response information to an information communication apparatus (100C) having access to a communication network (120) includes: a broadcast-wave I/F that receives the transmission information; a wireless I/F that transmits the response information to the information communication apparatus (100C) capable of wireless communication to relay the response information to an area having access to the communication network (120); a communication network I/F that is connected to the communication network (120) and transmits the response information; a response-transmission-information generating unit that generates the response information; and a connection control unit that determines whether the communication network (120) is accessible, transmits the response information to the communication network (120) when accessible, and relays the response information to the connectable information communication apparatus (100B) when inaccessible.

6 Claims, 12 Drawing Sheets

U.S. PATENT DOCUMENTS

| | | | |
|---|---|---|---|
| 2003/0162495 A1* | 8/2003 | Yonemoto et al. | 455/7 |
| 2003/0179742 A1* | 9/2003 | Ogier et al. | 370/351 |
| 2004/0121782 A1* | 6/2004 | Tester | 455/456.1 |
| 2005/0130611 A1* | 6/2005 | Lu et al. | 455/130 |
| 2005/0153650 A1* | 7/2005 | Hikomoto | 455/3.01 |
| 2006/0062363 A1 | 3/2006 | Albrett | |
| 2007/0030116 A1* | 2/2007 | Feher | 340/5.53 |

FOREIGN PATENT DOCUMENTS

| | | |
|---|---|---|
| JP | 9-238112 A | 9/1997 |
| JP | 11-289349 A | 10/1999 |
| JP | 2001-076275 A | 3/2001 |
| JP | 2003-078830 A | 3/2003 |
| JP | 2003-348034 A | 12/2003 |
| JP | 2004-297131 A | 10/2004 |
| JP | 2005-269325 A | 9/2005 |
| JP | 2005-276062 A | 10/2005 |
| JP | 2005-295512 A | 10/2005 |
| KR | 1020050039178 A | 4/2005 |
| WO | 2004-077857 A1 | 9/2004 |

OTHER PUBLICATIONS

Notification of Transmittal of Translation of the International Preliminary Report on Patentability (Form PCT/IB/338) of International Application No. PCT/JP2007/057088 mailed Oct. 30, 2008 with Forms PCT/IB/373 and PCT/ISA/237.

Korean Office Action dated Aug. 10, 2010, issued in corresponding Korean Patent Application No. 10-2008-7023841.

Japanese Office Action issued Jun. 28, 2011 in Japanese Application No. 2008-508651.

Japanese Office Action dated Sep. 13, 2011, issued in corresponding Japanese Patent Application No. 2008-508651 w/partial translation.

Extended European Search Report dated Jan. 17, 2013, issued in corresponding European Patent Application No. 07740524.9 (11 pages).

\* cited by examiner

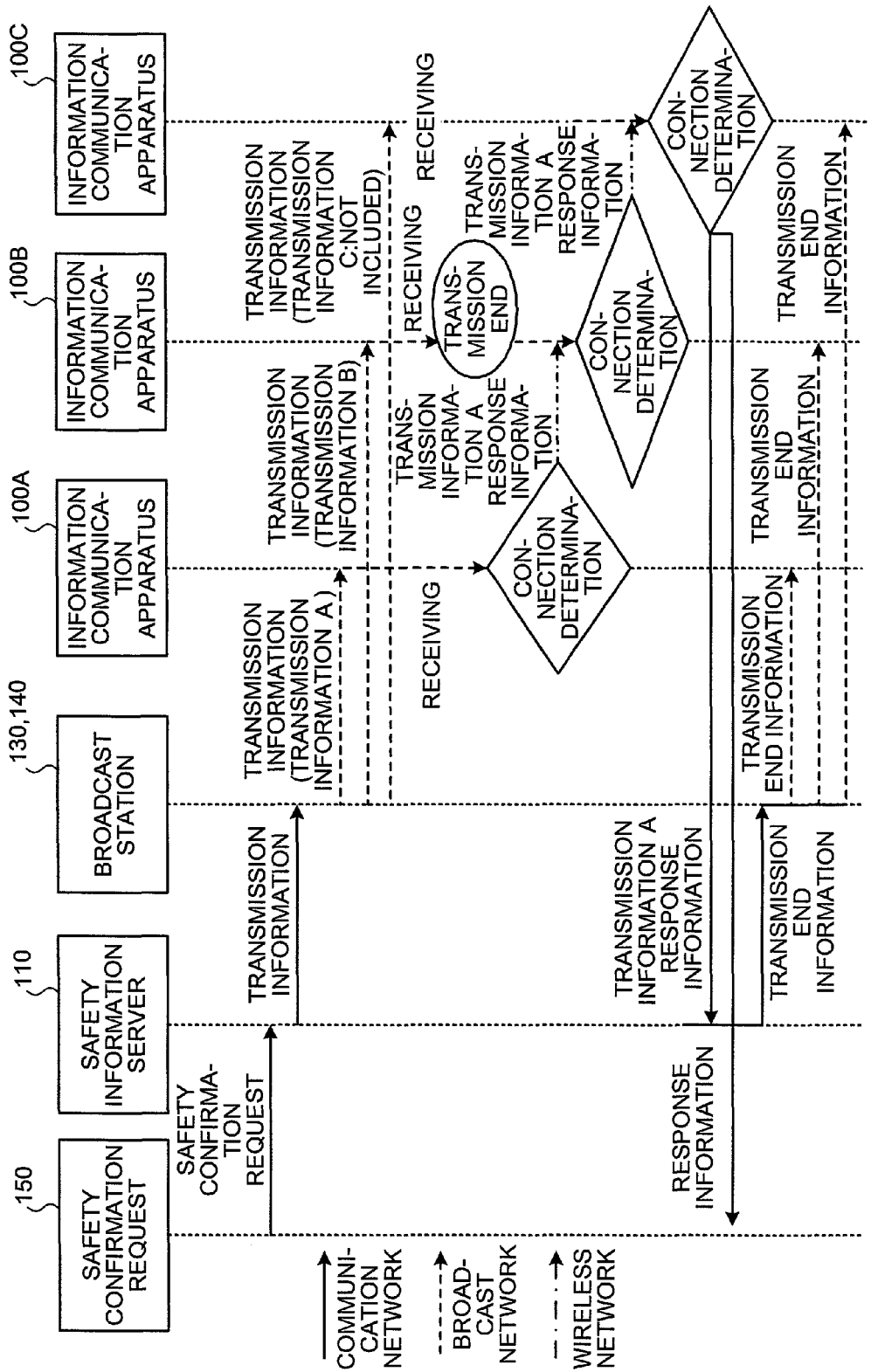

| RECORD ID | DESTINATION NAME | DESTINATION ADDRESS | CLIENT NAME | CLIENT ADDRESS | CONTENTS | RELAY PERMISSIBILITY | AUTHENTICATION FUNCTION INFORMATION | | MAXIMUM HOP NUMBER |
|---|---|---|---|---|---|---|---|---|---|
| | | | | | | | LOGIN ID | LOGINPW | |
| 000011 | KIMURA TARO | taro@com 123.##6.7.8 0909##10001 | KIMURA ICHIRO | kimura@com 123.##1.7.9 | ANSWER ME | PERMITTED | SDHG72 | kihs8 | 20 |
| 000012 | TANAKA TAKASHI | takashi@com 123.11#.7#.1 | TANAKA HITOSHI | tanaka@com 123.11#.7.8 09054##1111 | CONTACT ME | NOT PERMITTED | | | |
| .. | .. | .. | .. | .. | .. | .. | .. | | .. |

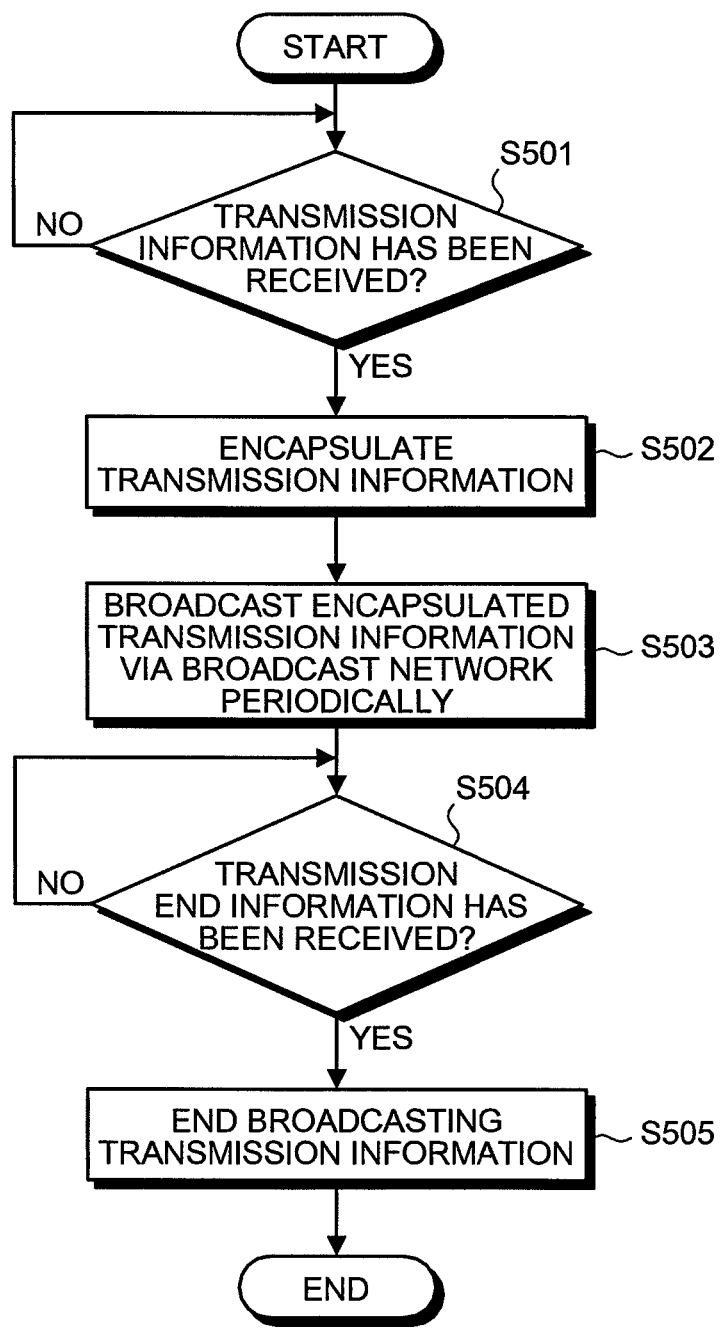

FIG.6-4

(RECCORD ID) 000011
(RESPONSE DESTINATION) taro@com
(RESPONSE DESTINATION NAME) KIMURA TARO
(SOURCE) kimura@com
(SOURCE NAME) KIMURA ICHIRO
(SAFETY-INFORMATION SERVER ADDRESS)
(CONTENTS)
・USER GENERATED CONTENTS
・GPS INFORMATION (MAXIMUM HOP NUMBER) 20

~640

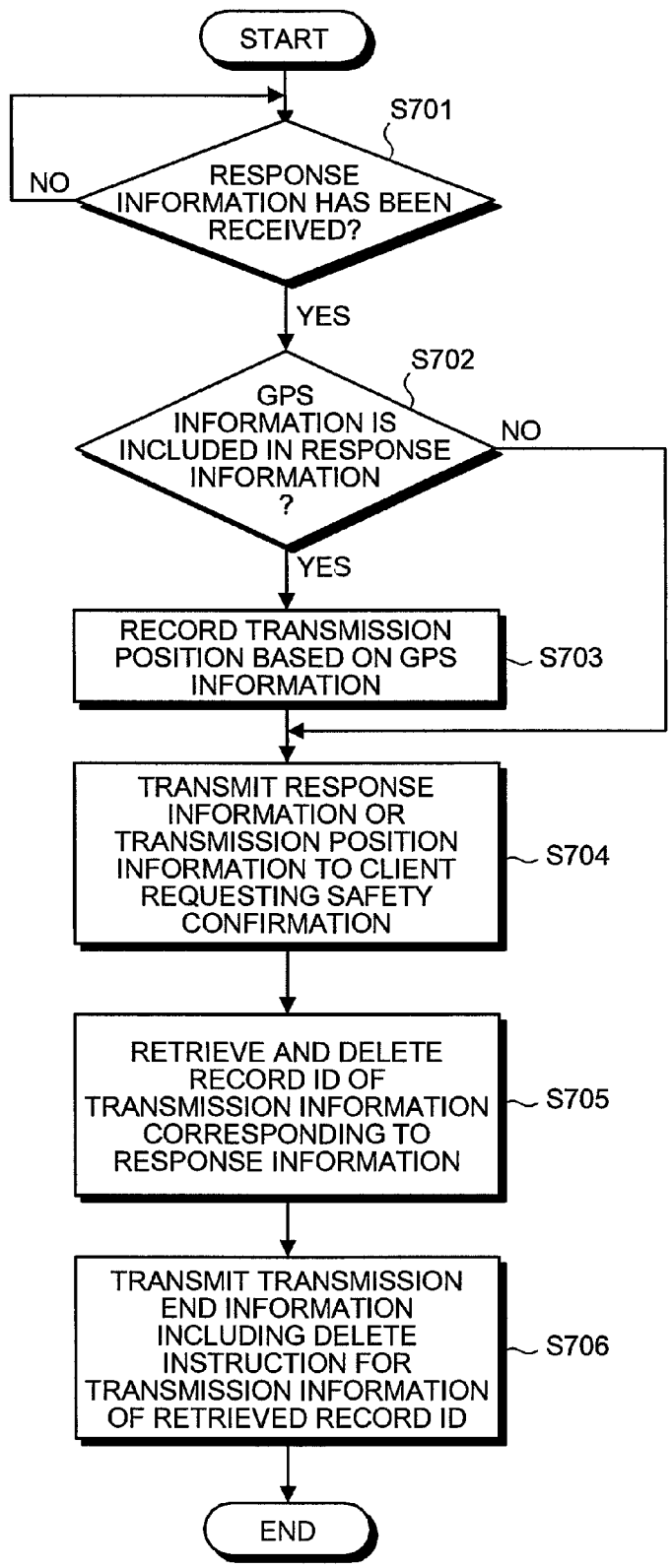

FIG.7-2

| RECORD ID | DESTINATION NAME | DESTINATION ADDRESS | CLIENT NAME | CLIENT ADDRESS | CONTENTS | RELAY PERMISSIBILITY | AUTHENTICATION FUNCTION | MAXIMUM HOP NUMBER |
|---|---|---|---|---|---|---|---|---|
| 000012 | TANAKA TAKASHI | takashi@com 123.11#.7#.1 | TANAKA HITOSHI | tanaka@com 123.11#.7.8 09054##1111 | CONTACT ME | NOT PERMITTED | | |
| .. | .. | .. | .. | .. | .. | .. | .. | .. |

720

INFORMATION COMMUNICATION APPARATUS, INFORMATION TRANSMITTING APPARATUS, AND INFORMATION COMMUNICATION METHOD

TECHNICAL FIELD

The present invention relates to an information communication apparatus that can relay successively between plural communication apparatuses, information received from a transmitting side, and particularly relates to an information communication apparatus, an information transmitting apparatus, and an information communication method enabling information in response to the information relayed between the plural communication apparatuses to be transmitted back to the transmitting side.

BACKGROUND ART

Conventionally, information to be transmitted from a transmitting side has been transmitted using a broadcast wave or via a communication network, and received by a terminal apparatus on a receiving side. Nowadays, even a mobile device such as a cellular phone can receive information such as a television program and a radio program (see, for example, Patent Document 1 below).

Patent Document 1: Japanese Patent Application Laid-open Publication No. 2003-78830.

DISCLOSURE OF INVENTION

Problem to be Solved by the Invention

However, in the conventional technique, since the broadcast wave has been for unidirectional communication from the transmitting side to the receiving side, a response has not been able to be transmitted back from the receiving side to the transmitting side when service by a communication provider is disrupted. When a fixed phone or a cellular phone network is unavailable, a response cannot be transmitted, either.

For example, when communication service is disrupted in a disaster area, there has been no way to transmit a response from the disaster area to a relief center, for example. In this case, the broadcast wave is received in the disaster area, but the communication service is disrupted. Therefore, a response to safety confirmation information has not been able to be transmitted back from the disaster area.

Not only in the above case of a disaster area, but in a case in which there is an area within which communication service is disrupted, there has been a problem in that bidirectional communication has not been able to be performed within the area.

To solve the above problems associated with conventional technologies, it is an object of the present invention to provide an information communication apparatus, an information transmitting apparatus, and an information communication method that can communicate information within a disrupted area where communication service is disrupted and from the disrupted area, transmit information to a destination outside the disrupted area.

Means for Solving Problem

To solve the above problems and achieve an object, an information communication apparatus according to an aspect of the present invention, receives communication data transmitted from an information transmitting apparatus, and via a path accordant with accessibility to a communication network, relays, to an information communication apparatus having access to the communication network, response data based on the communication data. The information communication apparatus includes a broadcast-wave receiving unit that receives the communication data transmitted as a broadcast wave; a wireless communication unit that transmits the communication data to another information communication apparatus within a wireless-communication range to relay the response data to an area with access to the communication-network access; a communication-network connection unit that connects to the communication network and transmits the response data; a response-data generating unit that generates the response data based on the communication data received by the broadcast-wave receiving unit; and a connection control unit that determines whether the communication network is accessible, transmits the response data from the communication-network connection unit to the communication network when the communication network is accessible, and relays the response data from the wireless communication unit to another information communication apparatus with which a connection can be established, when the communication network is inaccessible.

An information communication apparatus according to another aspect of the present invention is characterized by the connection control unit transmitting or relaying the response data based on information concerning a transmission setting in the response data when the wireless communication unit receives the response data relayed by another information communication apparatus. 2.

An information communication apparatus according to another aspect of the present invention is characterized by the communication data and the response data being configured as IP packets, in which the information communication apparatus further includes a communication-data acquiring unit that acquires communication data of the IP packets received by the broadcast-wave receiving unit and addressed to the information communication apparatus, the response-data generating unit generates the response data based on the communication data acquired by the communication-data acquiring unit, and the connection control unit transmits the response data to a specified address.

An information communication apparatus according to another aspect of the present invention further includes a GPS-signal receiving unit that receives GPS signals output from GPS signal satellites; and a GPS-information acquiring unit that acquires, from the GPS signals, GPS information concerning position information of the information communication apparatus. The GPS information is added to the response data generated by the response-data generating unit.

An information transmitting apparatus according to another aspect of the present invention transmits communication data to a plurality of information communication apparatuses that relay the communication data therebetween until the communication data reaches a preferred information communication apparatus. The information transmitting apparatus includes a broadcasting unit that broadcasts the communication data to the information communication apparatuses via a broadcast network; a communication-network receiving unit that receives, via a communication network, response data generated by one of the information communication apparatuses that receives the communication data broadcasted by the broadcasting unit; and a communication-data control unit that controls transmission of the communication data and receipt of the response data based on the communication data broadcasted by the broadcasting unit and the response data corresponding thereto.

An information transmitting apparatus according to another aspect of the present invention is characterized by the communication-data control unit causing the broadcasting unit to periodically broadcast the communication data and based on the receipt of the response data by the communication-network receiving unit, ending the broadcasting of the communication data.

An information communication method according to another aspect of the present invention involves receiving communication data transmitted from an information transmitting apparatus, and via a path accordant with accessibility to a communication network, relaying, to an information communication apparatus having access to the communication network, response data based on the communication data. The information communication method includes a broadcast-wave receiving step of receiving the communication data transmitted as a broadcast wave; a response-data generating step of generating response data based on the communication data received at the broadcast-wave receiving step; an access determining step of determining whether the communication network is accessible; a transmitting step of transmitting the response data to the communication network, when the communication network is determined accessible at the access determining step; and a response-data relaying step of relaying the response data to another information communication apparatus with which a connection can be established, when the communication network is determined inaccessible at the access determining step.

An information transmitting method according to another aspect of the present invention involves transmitting communication data to a plurality of information communication apparatuses that relay the communication data therebetween until the communication data reaches a preferred information communication apparatus. The information transmitting method includes a broadcasting step of broadcasting the communication data to the information communication apparatuses via a broadcast network; a communication-network receiving step of receiving, via a communication network, response data generated by one of information communication apparatuses that receives the communication data broadcasted at the broadcasting step; and a communication-data control step of controlling transmission of the communication data and receipt of the response data based on the communication data broadcasted at the broadcasting step and the response data corresponding thereto.

An information communication method according to another aspect of the present invention involves transmitting communication data from an information transmitting apparatus, receiving the communication data, and via a path accordant with accessibility to a communication network, relaying, to an information communication apparatus having access to the communication network, response data based on the communication data. The information communication method includes a broadcasting step of broadcasting, by the information transmitting apparatus, the communication data to an information communication apparatus via a broadcast network; a broadcast-wave receiving step of receiving, at the information communication apparatus, the communication data transmitted as a broadcast wave; a response-data generating step of generating response data based on the communication data received at the broadcast-wave receiving step; an access determining step of determining whether the communication network is accessible; a transmitting step of transmitting the response data to the communication network when the communication network is determined accessible at the access determining step; a response-data relaying step of relaying the response data to another connectable information communication apparatus recursively until the response data is relayed to the information communication apparatus having access to the communication network, when the communication network is determined inaccessible at the access determining step; a communication-network receiving step of receiving, at the information transmitting apparatus, via the communication network, the response data generated by the information communication apparatus; and a communication-data control step of controlling transmission of the communication data and receipt of the response data based on the communication data broadcasted by the broadcasting unit and the response data corresponding thereto.

Effect of the Invention

According to the information communication apparatus, the information transmitting apparatus, and the information communication method, information can be communicated within a disrupted area where communication service is disrupted and from the disrupted area, information can be transmitted to a destination outside the disrupted area.

BRIEF DESCRIPTION OF DRAWINGS

FIG. 3 is a sequence chart of processing in the configuration example of the system shown in FIG. 1;

FIG. 4-1 is a flowchart of a process performed by a safety information server according to the present invention;

FIG. 4-2 is a chart of an example of a table of transmission information;

FIG. 5 is a flowchart of a process performed by a broadcast facility according to the present invention;

FIG. 6-1 is a first flowchart of a process performed by the information communication apparatus according to the present invention;

FIG. 6-2 is a second flowchart of a process performed by the information communication apparatus according to the present invention;

FIG. 6-3 is a third flowchart of a process performed by the information communication apparatus according to the present invention;

FIG. 6-4 is a schematic of an example of a configuration of response information;

FIG. 7-1 is a flowchart of a process performed by the safety information server upon receiving information transmitted by the information communication apparatus; and FIG. 7-2 is a chart of an example of a transmission information table after safety confirmation.

Figure 1:
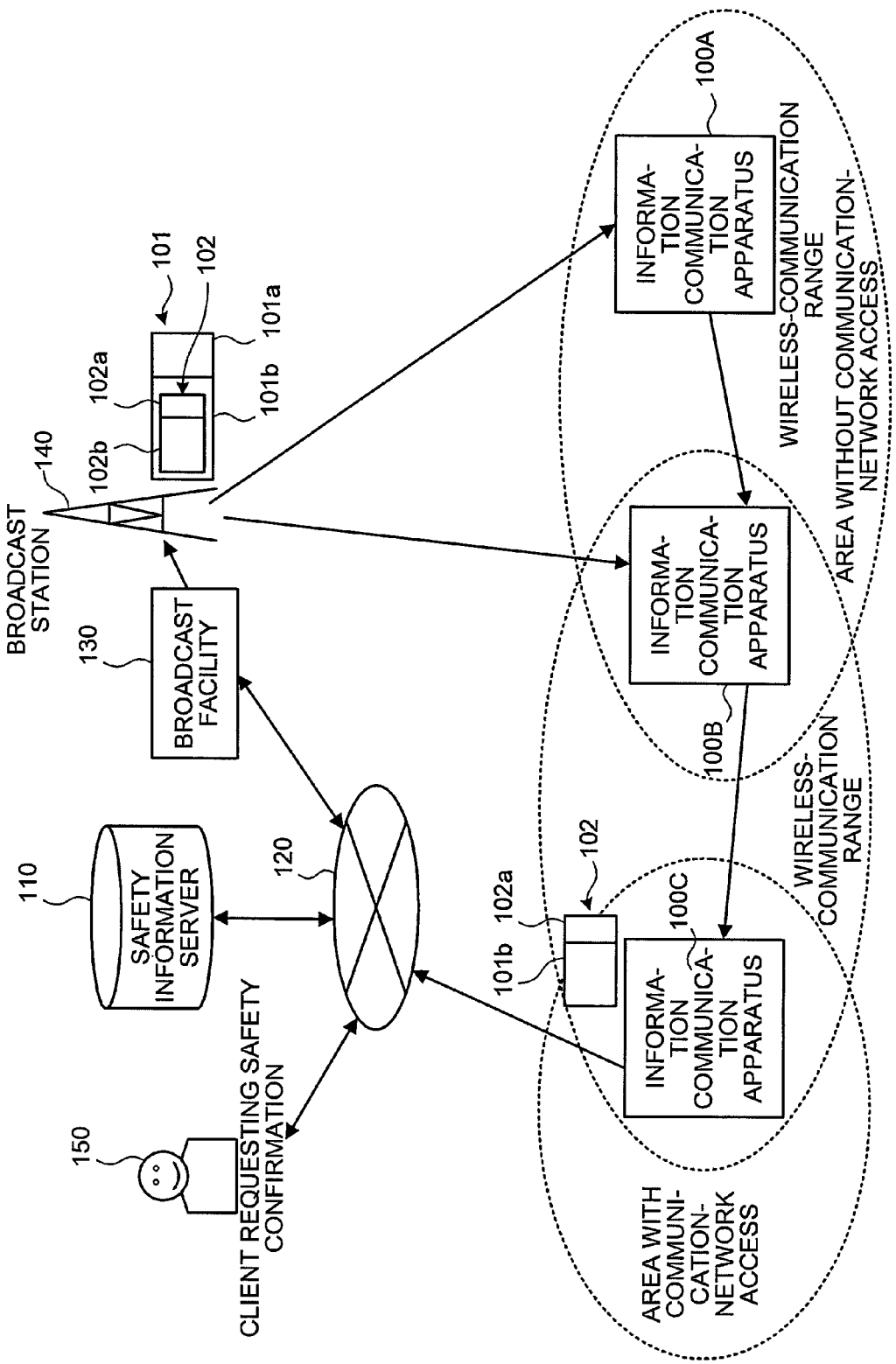
FIG. 1 is an explanatory diagram of an example of a configuration of a system implementing an information communication method according to an embodiment of the present invention.

EXPLANATIONS OF LETTERS OR NUMERALS 100A-100C information communication apparatus
110 safety information server
120 communication network
130 broadcast facility
140 broadcast network
150 client requesting safety confirmation

BEST MODE(S) FOR CARRYING OUT THE INVENTION

With reference to the accompanying drawings, exemplary embodiments of the information communication apparatus, the information transmitting apparatus, and the information communication method according to the present invention are explained in detail below.

(System Configuration)

FIG. 1 is an explanatory diagram of an example of a configuration of a system implementing the information communication method according to an embodiment of the present invention. The information communication method according to the embodiment of the present invention is implemented by a system configuration using information communication apparatuses 100A to 100C each carried by a user, a safety information server 110 as the information transmitting apparatus, and a broadcast facility 130. Each of the apparatuses above transmits IP packets using a communication network 120 and a broadcast network 140. The communication network 120 includes a fixed network, a cellular phone network, a wireless LAN, and the like.

The information communication apparatuses 100A to 100C are mobile communication apparatuses, and have a function of performing bidirectional communication via the communication network 120 as a cellular phone, a function of receiving a broadcast wave via the broadcast network 140 transmitted by a broadcast station, and a function of performing wireless bidirectional communication among the information communication apparatuses 100A to 100C. Detailed configurations of the information communication apparatuses 100A to 100C are explained hereinafter with reference to drawings.

When there is an area in which communication service is disrupted such as when a disaster occurs, the safety information server 110 receives a request for safety confirmation from a client requesting safety confirmation 150, and generates transmission information for the safety confirmation as IP packets. The generated transmission information is transmitted to the information communication apparatuses 100A to 100C to perform the safety confirmation using a broadcast station (the broadcast facility 130 and the broadcast network 140). The safety information server 110 receives, via the communication network 120, response information transmitted back from the information communication apparatuses 100A to 100C that have received the transmission information, and updates the transmission information of the request for the safety confirmation.

The broadcast facility 130 encapsulates the transmission information (IP packets) received via the communication network 120, and transmits the encapsulated transmission information via the broadcast network 140. The encapsulation is processing of storing, using a given packet format such as a MPEG2-TS packet 101, an IP packet 102 of the transmission information including a header 102a and a payload 102b into a MPEG2-TS payload 101b of the MPEG2-TS packet 101.

Upon receiving the MPEG2-TS packet 101, the information communication apparatuses 101A to 100C perform receiving by decapsulating the received MPEG2-TS packet 101, and retrieving the IP packet 102 from the payload 101b. Upon wireless bidirectional communication among the information communication apparatuses 100A to 100C, connection establishment processing is performed with one another.

(Configuration of Information Communication Apparatus)

Figure 2:
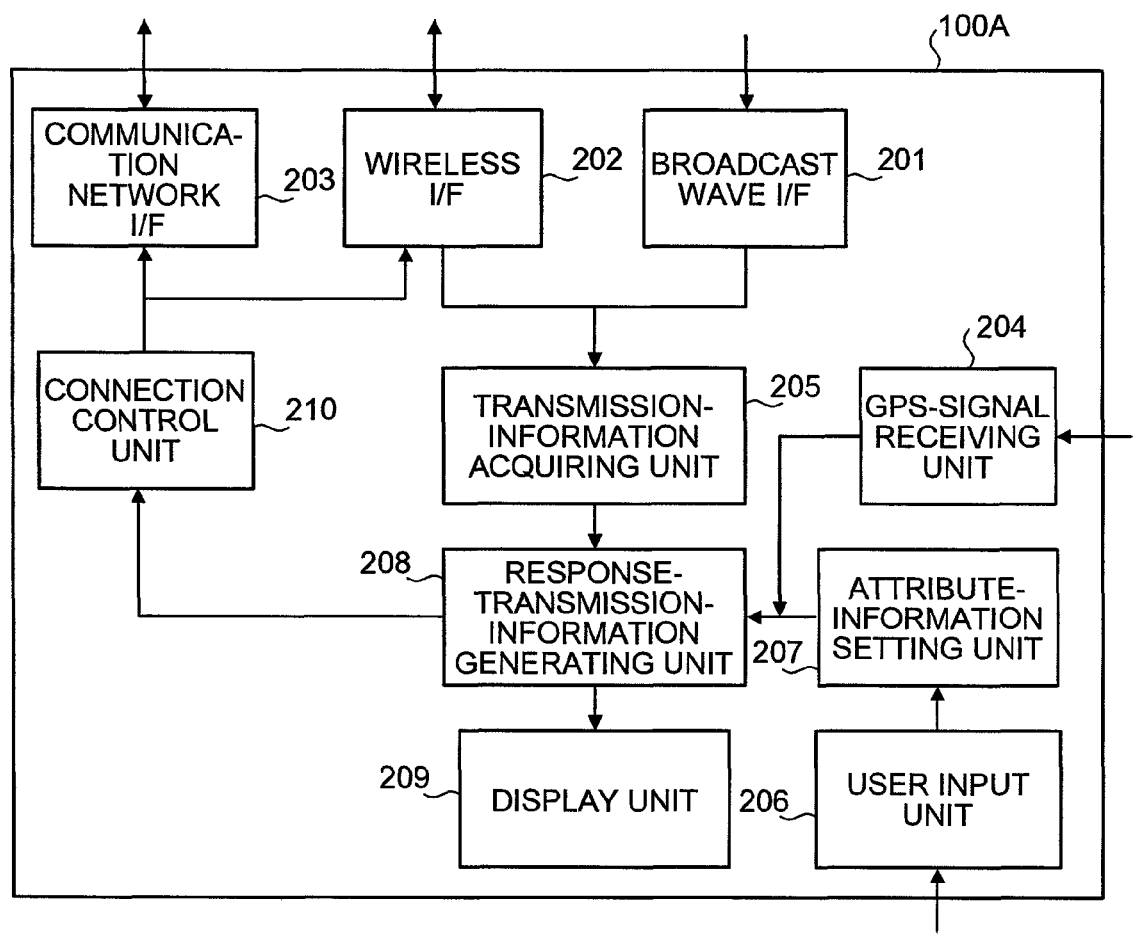
FIG. 2 is a block diagram of an information communication apparatus according to the embodiment of the present invention.

FIG. 2 is a block diagram of the information communication apparatus according to the embodiment of the present invention. The information communication apparatus 100A (100B, 100C) includes a broadcast wave I/F (interface) 201, a wireless I/F 202, a communication network I/F 203, a GPS-signal receiving unit 204, a transmission-information acquiring unit 205, a user input unit 206, an attribute-information setting unit 207, a response-transmission-information generating unit 208, a display unit 209, and a connection control unit 210.

The broadcast wave I/F 201 receives and decapsulates the MPEG2-TS packet 101 broadcasted via the broadcast network 140, and retrieves the IP packet 102 of the transmission information. The wireless I/F 202 transmits and receives IP packets for bidirectional communication with an apparatus such as the information communication apparatus 100B, 100C, and the like having a common wireless-communication format. The communication I/F 203 transmits and receives IP packets via the communication network 120. The GPS-signal receiving unit 204 receives GPS signals from GPS (global positioning system) satellites.

The transmission-information acquiring unit 205 acquires transmission information including a transmission condition or information to be transmitted, from the IP packets received by the broadcast wave I/F 201 or the wireless I/F 202. The user input unit 206 is input with information generated by a user of the information communication apparatus 100A. For example, the information input thereto includes safety information of the user generated by the user using a keyboard, and response information for received safety confirmation information. Audio data generated by the user using a microphone and the like may be input.

The attribute-information setting unit 207 acquires input information input through the user input unit 206, and sets attribute information (for example, a user name and an address) of the user of the information communication apparatus 100A. Using the user input information input through the attribute-information setting unit 207, and the GPS signals received by the GPS-signal receiving unit 204, the response-transmission-information generating unit 208 generates transmission information to respond to the client requesting safety confirmation 150 (hereinafter, "response information"). The display unit 209 displays the transmission information acquired through the response-transmission-information generating unit 208 and the response information using a display and the like. The connection control unit 210 determines, based on the header of the IP packet of the transmission information, a destination to transmit the response information generated by the response-transmission-information generating unit 208. Additionally, the connection control unit 210 connects to the wireless I/F 202 and the communication network I/F 203 according to the determined destination, and transmits the IP packet.

(Process of Each Apparatus)

Figures 1, 6:
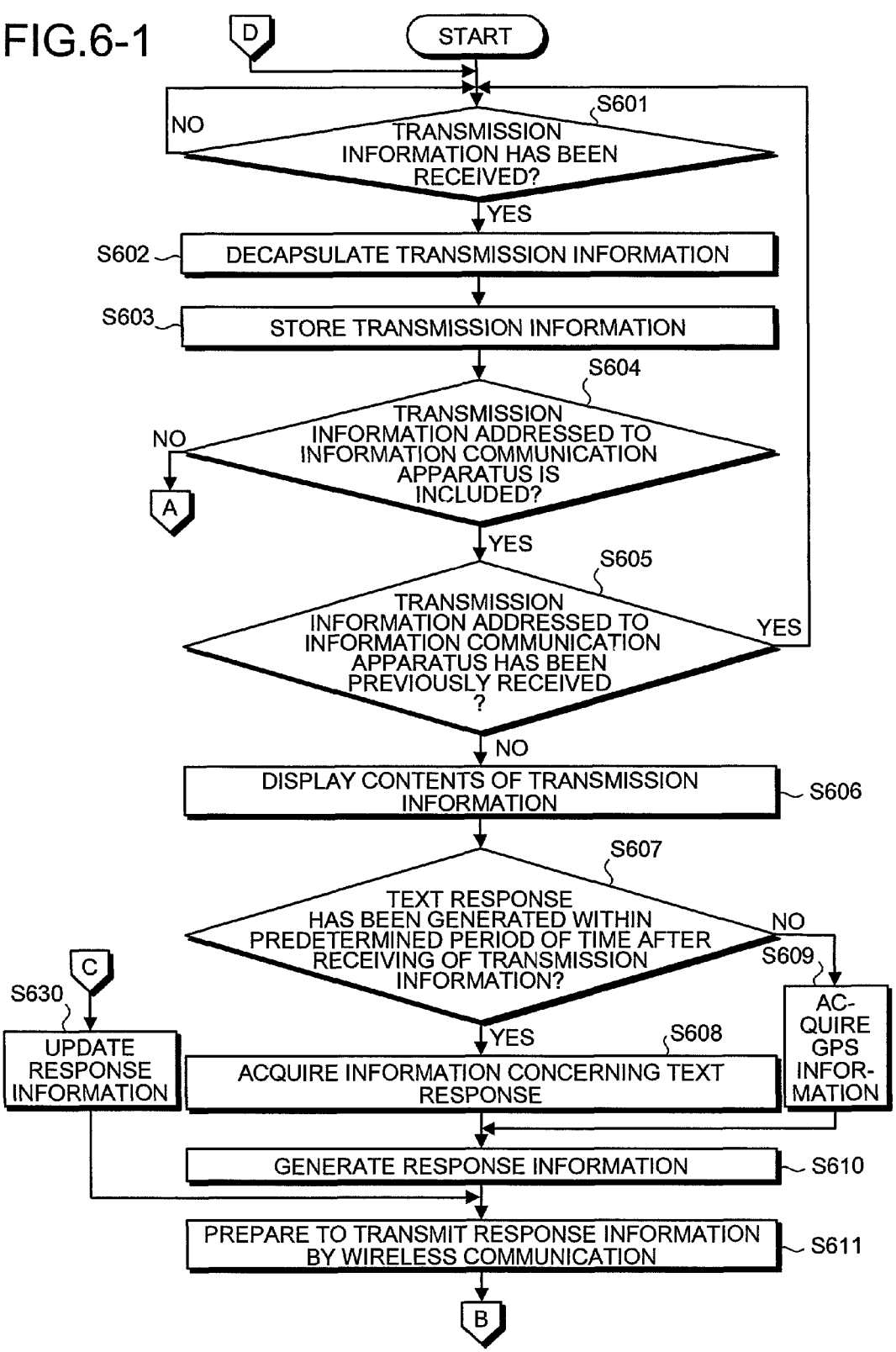
Figures 2, 6:
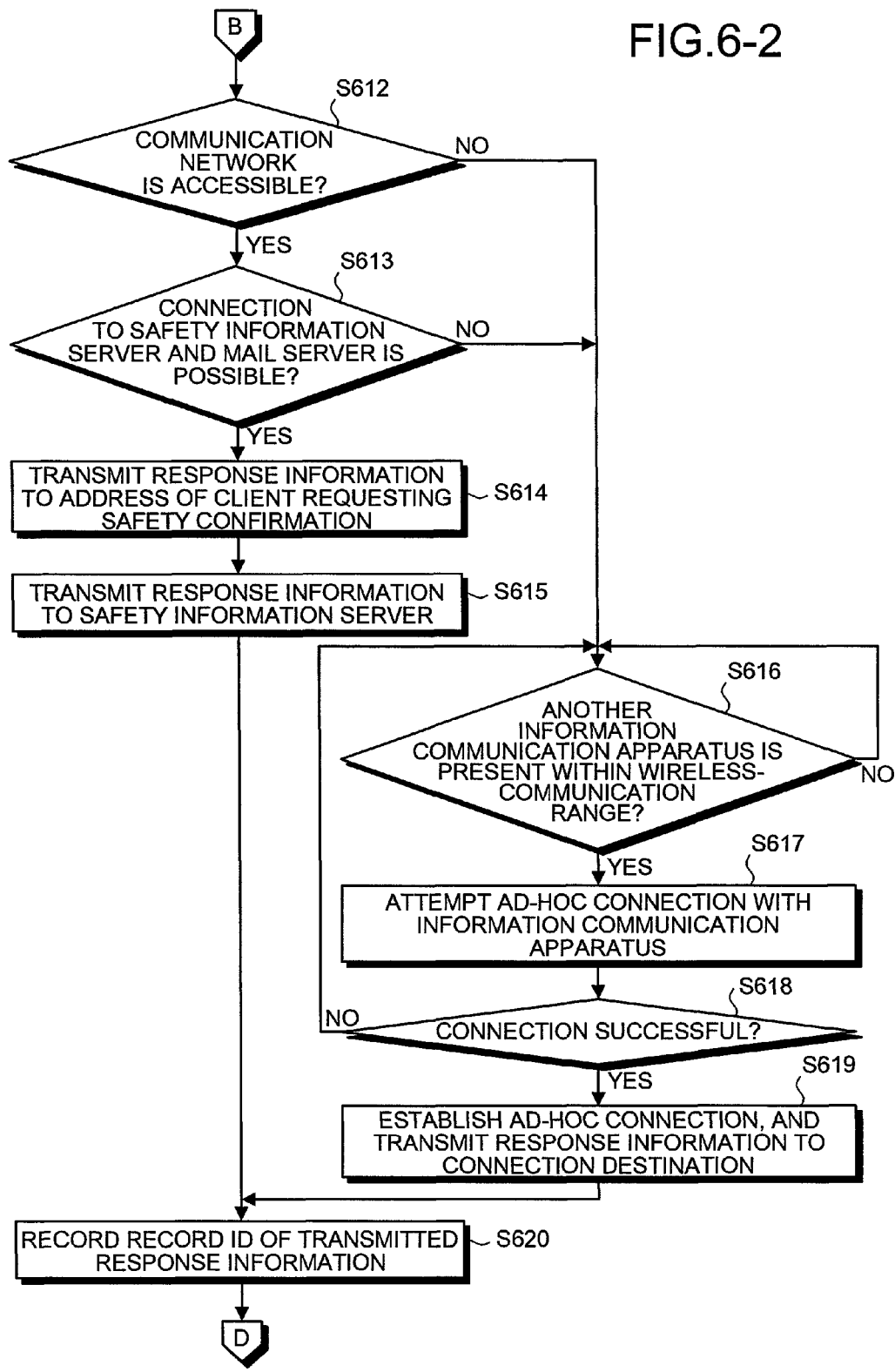
Figures 3, 6:
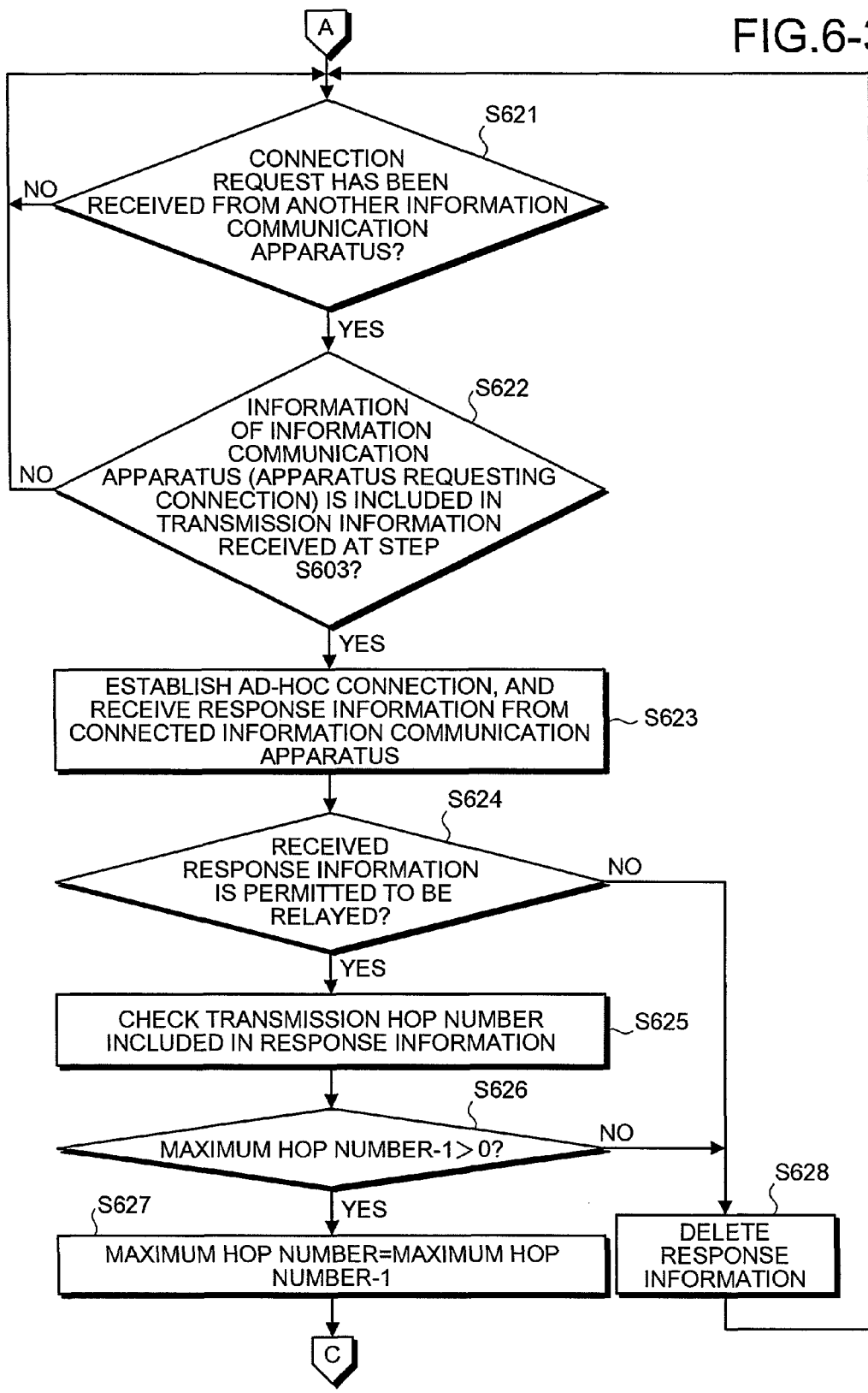

FIG. 3 is a sequence chart of processing in the configuration example of the system shown in FIG. 1. Regarding arrows representing information flow shown in FIG. 3, a solid line, a broken line, and a dash-dotted line are respectively used to indicate information flow via the communication network 120, information flow via the broadcast network 140, and information flow via the wireless network (wireless communication among the information communication apparatuses 100A to 100C).

As an example, the transmission information includes transmission information A addressed to the information communication apparatus 100A and permitted to be relayed, and transmission information B addressed to the information communication apparatus 100B and not permitted to be relayed. As shown in FIG. 1, the information communication apparatuses 100A and 100B are located within an "area without communication-network access" where the communication network 120 is inaccessible, and the information communication apparatus 100C is located within an "area with communication-network access" where the communication network 120 is accessible. The information communication apparatuses 100A and 100B, and the information communication apparatuses 100B and 100C are respectively located within a "wireless-network available area" where bidirectional communication with each other is available.

The client requesting safety confirmation 150 transmits a safety confirmation request to the safety information server 110 via the communication network 120. The safety information server 110 generates transmission information based on the received safety confirmation request. The generated transmission information is transmitted to the broadcast station (the broadcast facility 130, the broadcast network 140) via the communication network 120. The broadcast station encapsulates IP packets constituting the transmission information by the broadcast facility 130, and broadcasts the encapsulated IP packets via the broadcast network 140. At this time, the broadcast network 140 periodically broadcasts the transmission information so that the information communication apparatuses 100A to 100C do not fail to receive the transmission information.

Each of the information communication apparatuses 100A to 100C receives the transmission information. Specifically, the information communication apparatus 100A performs receiving by decapsulating the packets of the transmission information, and retrieving the transmission information A addressed to the information communication apparatus 100A. Similarly, information communication apparatus 100B performs receiving by decapsulating the packets of the transmission information, and retrieving the transmission information B addressed to the information communication apparatus 100B. The information communication apparatus 100C performs receiving by decapsulating the packets of the transmission information, but transmission information C addressed to the information communication apparatus 100C is not included. Therefore, the information communication apparatus 100C stores the received transmission information not for response purposes, but for determining whether to relay transmission information relayed by another information communication apparatus.

The information communication apparatus 100A receiving the transmission information determines whether the communication network 120 is accessible since the transmission information A is permitted to be relayed. Since the information communication apparatus 100A is located in the "area without communication-network access," the information communication apparatus 100A cannot access the communication network 120. Therefore, the information communication apparatus 100A performs connection determination to relay, to the information communication apparatuses 100B and 100C, response information responding to the transmission information A. Since the transmission information B is not permitted to be relayed, transmission by the information communication apparatus 100B is ended.

As a result of the connection determination, the information communication apparatus 100A determines connection to the information communication apparatus 100B to be possible and relays, to the information communication apparatus 100B via the wireless network, the response information responding to the transmission information A. When receiving the response information responding to the transmission information A, the information communication apparatus 100B confirms whether the transmission information A is permitted to be relayed based on the transmission information received via the broadcast network 104, and determines whether the communication network 120 is accessible. When the transmission information A is not permitted to be relayed, the information communication apparatus 100B only stores the transmission information A, and cannot relay the response information to the other information communication apparatus.

Since the information communication apparatus 100B located within the "area without communication-network access," the information communication apparatus 100B cannot access the communication network 120. Therefore, the information communication apparatus 100B performs connection determination to relay the response information to the next information communication apparatus 100 (for example, the information communication apparatus 100C). As a result of the connection determination, the information communication apparatus 100B determines connection to the information communication apparatus 100C to be possible and relays, to the information communication apparatus 100C via the wireless network, the response information responding to the transmission information A.

As explained above, since the information communication apparatus 100C is located within the "area with communication-network access," the information communication apparatus 100C can access the communication network 120. Therefore, the information communication apparatus 100C transmits the response information responding to the transmission information A to the safety information server 110 and the client requesting safety confirmation 150 via the communication network 120. The client requesting safety confirmation 150 confirms the safety of the user of the information communication apparatus 100A by receiving the response information. The safety information server 110 transmits transmission end information to the broadcast station (the broadcast facility 130, the broadcast network 140) upon receiving the response information.

The broadcast station (the broadcast facility 130, the broadcast network 140) ends the broadcasting of the transmission information upon receiving the transmission end information. Additionally, the broadcast station broadcasts transmission end information to the information communication apparatuses 100A to 100C via the broadcast network 140 of the broadcast network. Upon receiving the transmission end information, the information communication apparatuses 100A to 100C delete the transmission information of a record ID corresponding to the transmission end information from among the previously received transmission information. Therefore, the packets that cannot reach the area with communication-network access, are repeatedly relayed between the information communication apparatuses located within the area without communication-network access (within wireless communication range), and stay in a forwarding state, are discarded upon reception of the transmission end information at each of the information communication apparatuses.

Through the process explained above, the information communication apparatuses 100A to 100C according to the present invention, a communication confirmation server (the safety information server 110) and a broadcast apparatus (the broadcast facility 130) communicate with one another, and achieve safety confirmation. A detailed process of each apparatus is explained with reference to the drawings.

Figures 1, 4:
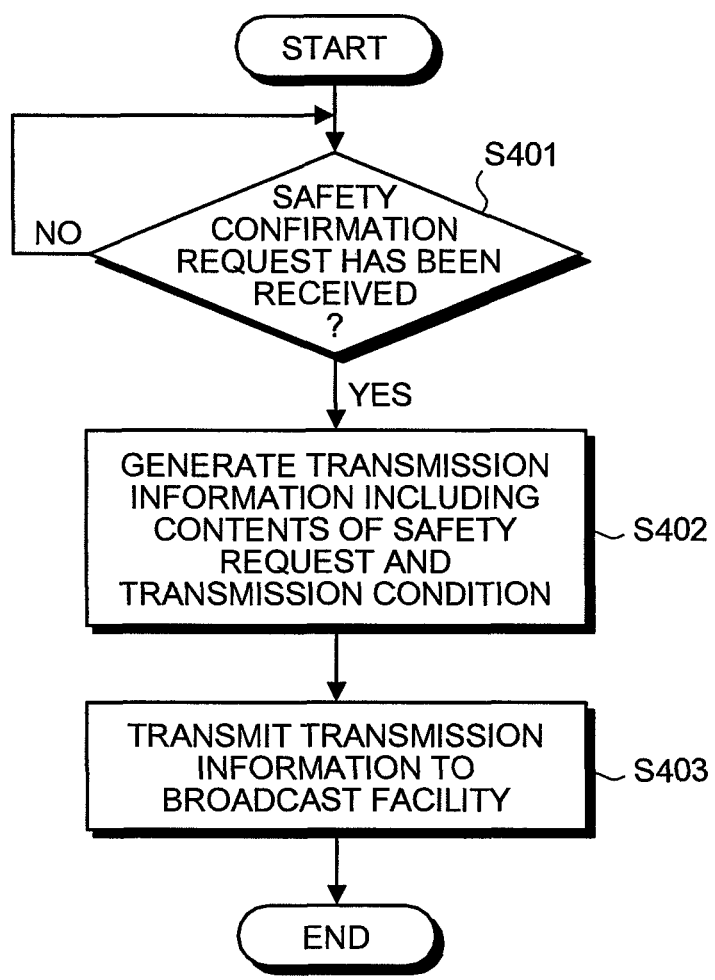

A process of transmitting information from the safety information server to the information communication apparatus according to the present invention is explained. FIG. 4-1 is a flowchart of a process performed by the safety information server according to the present invention. As shown in the flowchart of FIG. 4-1, it is determined whether a safety confirmation request has been received from the client requesting safety confirmation 150 (step S401). Receipt of the safety confirmation request is waited for, and if the safety confirmation request has been received (step S401: YES), transmission information including contents of the safety request and a transmission condition is generated based on the received safety confirmation request (step S402). The transmission information generated at step S402 is transmitted to the broadcast facility 130 (step S403), and a series of processing ends.

FIG. 4-2 is a chart of an example of a table of the transmission information. The transmission information generated by the safety information server 110 is configured to be a table such as a chart 420 shown in FIG. 4-2. A record ID is appended to each piece of transmission information and each piece of transmission information includes the following information.

Destination name: a name of a user targeted for safety confirmation

Destination address: an address of the user targeted for the safety confirmation and of the information communication apparatus 100A (an e-mail address, an IP address, a phone number, and the like)

Client name: a name of a client requesting the safety confirmation

Client address: an address of the client requesting the safety confirmation (an e-mail address, an IP address, a phone number, and the like)

Contents: a message to the user targeted for the safety confirmation (text or voice)

Relay permissibility: indicates relay permissibility of the transmission information to the wireless network and the communication network Authentication function information: information including an authentication function for establishing ad-hoc connection by wireless communication among the information communication apparatuses 100A to 100C Maximum hop number: the maximum number of information communication apparatuses 100 that the transmission information can be relayed to (hop: pass)

Although in the above example of the table of the transmission information, an e-mail address, an IP address, a phone number, and the like are shown as a destination address and a client address, information specified as an address may be selected according to specifications of the information communication apparatus used by a user and communication conditions. Therefore, all of the information shown is not required, address information different from the information shown may be used. The authentication function information includes, for example, a login ID and a password, and a login ID and a login password are used in the example shown in FIG. 4-2. In addition to these, upon determination of whether relay is to be performed, the relay permissibility and the maximum hop number are shown as an example since the preliminarily set maximum hop number is assumed as an upper limit of the number of relays. However, it is not limited hereto, whether relay is performed may be determined based on different set information.

A process performed by the broadcast facility according to the present invention is explained. FIG. 5 is a flowchart of processing performed by the broadcast facility according to the present invention. As shown in the flowchart of FIG. 5, it is determined whether transmission information has been received from the safety information server 110 (step S501). Receipt of the transmission information is waited for, and if the transmission information has been received (step S501: YES), the transmission information is encapsulated (step S502).

The transmission information encapsulated at step S502 is broadcasted periodically (step S503). It is determined whether transmission end information has been received (step S504). Receipt of the transmission end information in conjunction with the completion of safety confirmation using the transmission information transmitted by the safety information server 110 is waited for (step S504: YES), broadcasting of the transmission information ends (step S505), and a series of processing ends.

A process performed by the information communication apparatus according to the present invention is explained. FIGS. 6-1 to 6-3 are flowcharts of processing performed by the information communication apparatus according to the present invention. As shown in the flowchart of FIG. 6-1, it is determined whether the transmission information encapsulated and broadcasted via the broadcast network 140 has been received (step S601). Receipt of the transmission information is waited for, and if the transmission information has been received (step S601: YES), the transmission information is decapsulated (step S602).

All the transmission information decapsulated at step S602 is stored in the information communication apparatus (step S603). Each of the information communication apparatuses (100A to 100C) includes a storing unit that stores transmission information, which can be overwritten according to the receipt of transmission information. It is determined whether transmission information addressed to the information communication apparatus (here, any one of the information communication apparatuses 100A to 100C) is included (step S604). Specifically, the determination is performed by comparing the attribute information stored in the transmission information (a destination name, a destination address) to the attribute information of the attribute-information setting unit 207 of the information communication apparatus (see FIG. 2).

When the transmission information addressed to the information communication apparatus is included at step S604 (step S604: YES), it is determined whether the transmission information addressed to the information communication apparatus has been previously received (step S605). When the transmission information addressed to the information communication apparatus is not included (step S604: NO), the process proceeds to step S621 shown in FIG. 603.

When the transmission information addressed to the information communication apparatus has been previously received (step S605: YES), receipt of transmission information is waited for again at step S601. If the transmission information addressed to the information communication apparatus has not been previously received (step S605: NO), contents of the transmission information addressed to the information communication apparatus is displayed (step S606). The contents of the transmission information is a message (text or voice) from the client requesting safety confirmation 150 to a user of the information communication apparatus as shown in FIG. 4-2, and the display unit 209 (see FIG. 2) causes the user to confirm the contents.

It is determined whether a text response addressed to the client requesting safety confirmation 150 has been generated within a given period of time by the user who has confirmed the contents of the transmission information at step S606 (step S607). When the text response has been generated (step S607: YES), information concerning the text response is acquired by the user input unit 206 (see FIG. 2) (step S608), and response information is generated based on the acquired text response (step S610). When the text response has not been generated (step S607: NO), GPS information is acquired by the GPS-signal receiving unit 204 (see FIG. 2) (step S609), and response information is generated based on the acquired GPS information (step S610).

FIG. 6-4 is a schematic of an example of a configuration of the response information. The response-transmission-information generating unit 208 (see FIG. 2) generates the response information such as a configuration example 640. Transmission of the response information using the wireless communication is prepared (step S611), and the process proceeds to step S612 shown in FIG. 6-2.

As shown in the flowchart of FIG. 6-2, it is determined whether the communication network 120 is accessible (step S612). When the communication network 120 is accessible (step S612: YES), it is determined whether connection to the safety information server 110 and a server relevant to the client address (such as a mail server corresponding to the address of the client requesting safety confirmation 150 that is a destination of the response information) is possible (step S613). When connection to the safety information server 110 and the server relevant to the client address is possible (step S613: YES), the response information is transmitted to the address of the client requesting safety confirmation 150 (step S614) and to the safety information server 110 (step S615).

When connection to the safety information server 110 and the server relevant to the client address is not possible (step S613: NO), the response information must be relayed to the information communication apparatus (the information communication apparatus C in the case of FIG. 1) capable of accessing the communication network 120, the safety information server 110, and the server relevant to the client address.

Therefore, it is determined whether another information communication apparatus (any of 100A to 100C) is present within wireless-communication range (step S616). This determination is performed based on receipt of an electronic wave of the wireless communication from the other information communication apparatus (any of 100A to 100C). The appearance of another information communication apparatus within wireless-communication range is waited for, and if another information communication apparatus has appeared (step S616: YES), the information communication apparatuses (any two of 100A to 100C) attempt ad-hoc connection with each other (step S617). The ad-hoc connection is a method of communicating information directly among an unspecified number of individuals. The authentication function information stored in the transmission information is used for the ad-hoc connection.

It is determined whether the ad-hoc connection is successful at step S617 (step S618). Success of the ad-hoc connection is waited for, and if the ad-hoc connection is successful (step S618: YES), the ad-hoc connection is established, and the response information is transmitted to a connected destination (step S619).

If the ad-hoc connection is unsuccessful at step S618 (step S618: NO), a standby state is assumed until another information communication apparatus (any of 100A to 100C) appears at step S616. After the response information is transmitted as explained above, a record ID of the transmitted response information is stored (step S620), the process proceeds to step S601 shown in FIG. 6-1, and a standby state for receiving transmission information is assumed.

With reference to FIG. 6-3, explanation of the information communication apparatuses 100A to 100C is continued. When the transmission information addressed to the information communication apparatus is not included at step S604 shown in FIG. 6-1 (step S604: NO), it is determined whether a connection request has been received from another information communication apparatus (any of 100A to 100C) (step S621). A connection request is waited for, and if a connection request has been received (step S621: YES), it is determined whether information of the information communication apparatus (the apparatus transmitting the connection request) (a record ID, an address, authentication function information, and the like) is included in the transmission information received at step S603 (step S622).

When the information of the information communication apparatus that has transmitted the connection request is not included in the stored transmission information (step S622: NO), the standby state at step S621 is assumed. When the information of the information communication apparatus that has transmitted the connection request is included in the stored transmission information (step S622: YES), the ad-hoc connection is established using the authentication information included in the transmission information, and the response information is received from the connected information communication apparatus (any of 100A to 100C) (step S623).

It is determined whether the response information received at step S623 is permitted to be relayed (step S624). The determination is performed with reference to the relay permissibility for the transmission information received at step S603. When the received response information is permitted to be relayed (step S624: YES), the transmission hop number included in the response information is checked (step S625). At this time, it is determined whether "the maximum hop number−1" which is the maximum hop number less 1 set as the transmission hop number is greater than 0 (step S626). When "the maximum hop number−1" is greater than 0 (step S626: Yes). In other words, 1 is subtracted from the maximum hop number of the response information and the result is newly reset as the maximum hop number, and the process proceeds to step S630 shown in FIGS. 6-1.

When the received response information is not permitted to be relayed at step S624 (step S624: NO), or when the maximum hop number is 0 or less at step S626 (step S626: NO), since the response information is not to be relayed any longer, the response information is deleted (step S628) and a connection request from another information communication apparatus is waited for (any of 100A to 100C) at step S621.

Lastly, a process performed by the safety information server upon receiving the information transmitted by the information communication apparatus is explained. FIG. 7-1 is a flowchart of the process performed by the safety information server upon receiving the information transmitted by the information communication apparatus. As shown in the flowchart of FIG. 7-1, it is determined whether the response information has been received from the information communication apparatus (any of 100A to 100C) (step S701). Receipt of the response information is waited for, and when the response information has been received (step S701: YES), it is determined whether GPS information is included in the response information (step S702).

When GPS information is included in the response information at step S702 (step S702: YES), a transmission position of the information communication apparatus (any of 100A to 100C) is recorded based on the GPS information (step S703), and process proceeds to step S704. When GPS information is not included in the response information (step S702: NO), the response information or the transmission position information is transmitted to the client requesting the safety confirmation (step S704), and then, a record ID of the transmission information corresponding to the response information is retrieved and deleted from among the transmission information that has been previously generated upon receiving the safety confirmation request (step S705). E-mail or a telephone is used for communication at step S704.

FIG. 7-2 is a chart of an example of a transmission information table after safety confirmation. As shown in a chart 720, assuming that the transmission information corresponding to the response information is the record ID of 000011 shown in FIG. 4-2, the record ID of 000011 has been deleted after the response information has been received at step S701, and only a record ID of 000012 remains. Transmission end information including a delete instruction for the transmission information of the retrieved record ID is transmitted to the broadcast station (step S706), a series of processing ends.

Upon receiving the transmission end information from the safety information server 110, the broadcast facility 130 of the broadcast station ends periodical broadcasting of the transmission information of the concerned record, and broadcasts transmission end information for the concerned record to the information communication apparatuses 100A to 100C via the broadcast network 140. Upon receiving the transmission end information, the information communication apparatuses 100A to 100C delete transmission information of the corresponding record ID. As a result, configuration of the transmission information table becomes that of the chart 720 shown in FIG. 7-2.

As explained above, according to the information communication apparatus, the communication confirmation server, the broadcast apparatus, and the information communication method of the present invention, even with the transmission method using a broadcast wave in which an unspecified number is targeted, only information relevant to each user can be acquired quickly. Additionally, even when a user receiving the broadcast wave cannot access the communication network, transmission is performed among the information communication apparatuses, thereby enabling the response information to be transmitted to a desired address via the information communication apparatus that establishes a connection to the communication network.

The information communication method explained in the present embodiment can be implemented by the information communication apparatuses 100A to 100C and a computer included in the information transmitting apparatus executing a program that is prepared in advance. This program is recorded on a computer-readable recording medium such as a hard disk, a flexible disk, a CD-ROM, an MO, and a DVD, and is executed by being read out from the recording medium by a computer. This program can be a transmission medium that can be distributed through a network such as the Internet.

INDUSTRIAL APPLICABILITY

As explained above, the information communication apparatus, the information transmitting apparatus, and the information communication method of the present invention are useful in the use of plural receiving terminals simultaneously receiving content via a broadcast network, and is particularly suitable for communication in a digital broadcast environment such as that for a satellite digital broadcast and a terrestrial digital broadcast.

The invention claimed is:

1. An information communication system, comprising:
an information transmitting apparatus including a broadcast station; and
a mobile information communication apparatus; the mobile information communication apparatus that receives communication data transmitted from the information transmitting apparatus, and via a path accordant with accessibility to a communication network, relays, to another mobile information communication apparatus having access to the communication network, response data based on the communication data,
the mobile information communication apparatus comprising:
a user input unit that receives user input data;
a broadcast-wave receiving unit that receives the communication data transmitted as a broadcast wave;
a wireless communication unit that transmits the response data to another mobile information communication apparatus within a wireless-communication range to relay the response data to an area with access to the communication-network access;
a communication-network connection unit that connects to the communication network and transmits the response data;
a response-data generating unit that generates the response data based on the communication data received by the broadcast-wave receiving unit and the user input data; and
a connection control unit that connects directly with the communication-network connection unit and the wireless communication unit that determines whether the communication network is accessible, transmits the response data from the communication-network connection unit to the communication network when the communication network is accessible, and relays the response data from the wireless communication unit to another mobile information communication apparatus with which a connection can be established, when the communication network is inaccessible,
the information communication system further comprising:
a safety information server that receives a request for safety confirmation from a client and generates transmission information for the safety confirmation as IP packets which is transmitted to the mobile information communication apparatus via the broadcast station.

2. The information communication system according to claim 1, wherein the connection control unit transmits or relays the response data based on information concerning a transmission setting in the response data when the wireless communication unit receives the response data relayed by another mobile information communication apparatus.

3. The information communication system according to claim 1, wherein
the communication data and the response data are configured as IP packets,
the mobile information communication apparatus further comprises a communication-data acquiring unit that acquires communication data of the IP packets received by the broadcast-wave receiving unit and addressed to the mobile information communication apparatus,
the response-data generating unit generates the response data based on the communication data acquired by the communication-data acquiring unit, and
the connection control unit transmits the response data to a specified address.

4. The information communication system according to claim 1, the mobile information communication apparatus further comprising:
a GPS-signal receiving unit that receives GPS signals output from GPS signal satellites; and a GPS-information acquiring unit that acquires, from the GPS signals, GPS information concerning position information of the mobile information communication apparatus, wherein the GPS information is added to the response data generated by the response-data generating unit.

5. An information communication method of receiving communication data transmitted from a mobile information transmitting apparatus, and via a path accordant with accessibility to a communication network, relaying, to another mobile information communication apparatus having access to the communication network, response data based on the communication data, the information communication method comprising:

a broadcast-wave receiving step of receiving the communication data transmitted as a broadcast wave;

a response-data generating step of generating response data based on the communication data received at the broadcast-wave receiving step and user input data;

an access determining step of determining whether the communication network is accessible;

a transmitting step of transmitting the response data to the communication network, when the communication network is determined accessible at the access determining step;

a response-data relaying step of relaying the response data to another mobile information communication apparatus with which a connection can be established, when the communication network is determined inaccessible at the access determining step; and a receiving step of receiving a request for safety confirmation from a client and generating transmission information for the safety confirmation as IP packets which is transmitted to another mobile information communication apparatus.

6. An information communication method of transmitting communication data from a mobile information transmitting apparatus, receiving the communication data, and via a path accordant with accessibility to a communication network, relaying, to another mobile information communication apparatus having access to the communication network, response data based on the communication data, the information communication method comprising:

a broadcasting step of broadcasting, by the mobile information transmitting apparatus, the communication data to a mobile information communication apparatus via a broadcast network;

a broadcast-wave receiving step of receiving, at the mobile information communication apparatus, the communication data transmitted as a broadcast wave;

a response-data generating step of generating response data based on the communication data received at the broadcast-wave receiving step and user input data;

an access determining step of determining whether the communication network is accessible;

a transmitting step of transmitting the response data to the communication network when the communication network is determined accessible at the access determining step;

a response-data relaying step of relaying the response data to another connectable mobile information communication apparatus recursively until the response data is relayed to the mobile information communication apparatus having access to the communication network, when the communication network is determined inaccessible at the access determining step;

a communication-network receiving step of receiving, at the mobile information transmitting apparatus, via the communication network, the response data generated by the mobile information communication apparatus;

a communication-data control step of controlling transmission of the communication data and receipt of the response data based on the communication data broadcasted at the broadcasting step and the response data corresponding thereto; and a receiving step of receiving a request for safety confirmation from a client and generating transmission information for the safety confirmation as IP packets which is transmitted to another mobile information communication apparatus.

* * * * *